United States Patent [19]

Matsukawa et al.

[11] Patent Number: 4,914,473

[45] Date of Patent: Apr. 3, 1990

[54] MULTIPLE-EXPOSURE APPARATUS IN A GRAPHIC ARTS COPYING MACHINE OF A SLIT-EXPOSURE TYPE

[75] Inventors: Masaaki Matsukawa; Eiji Miyasaka; Yoshio Sugimoto; Masayuki Handa; Morihiro Takeda, all of Hikone, Japan

[73] Assignee: Dainippon Screen Mfg. Co., Ltd., Japan

[21] Appl. No.: 300,917

[22] Filed: Jan. 24, 1989

[30] Foreign Application Priority Data

Jan. 25, 1988 [JP] Japan ................................. 63-15668

[51] Int. Cl.$^4$ ........................................... G03G 15/00
[52] U.S. Cl. ...................................................... 355/50
[58] Field of Search .................................. 355/27–29, 355/55, 48–51, 77

[56] References Cited

U.S. PATENT DOCUMENTS 3,656,851 4/1972 Kakii et al. ............................ 355/66
4,487,501 12/1984 Suzuki et al. ......................... 355/50
4,660,957 4/1987 Ueda et al. ......................... 355/50 X

FOREIGN PATENT DOCUMENTS 59-1050 1/1984 Japan .
61-4065 1/1986 Japan .

Primary Examiner—Donald A. Griffin
Attorney, Agent, or Firm—Ostrolenk, Faber, Gerb & Soffen

[57] ABSTRACT

A multiple-exposure apparatus in a graphic arts copying machine of a slit-exposure type includes an original holding member mounted for horizontal reciprocating motion. An optical exposure system exposes an optical image of a slitwise segment of the original onto a photosensitive material. A moving device reciprocates the holding member and conveys the photosensitive material relative to the optical system. The moving device is adapted to synchronize the advance of the original holding member and the conveyance of the photosensitive material. A data setting device is provided for setting predetermined data concerning a predetermined multiple-exposure layout mode of the original onto the photosensitive material. A control unit controls the operation of the optical exposure system by enabling and disabling the exposure by the optical system and also synchronizes the moving device in an associated relationship as a function of the predetermined set data. Multiple-exposures of the original thus are made on the photosensitive material in the prederemined multiple-exposure layout mode.

20 Claims, 11 Drawing Sheets

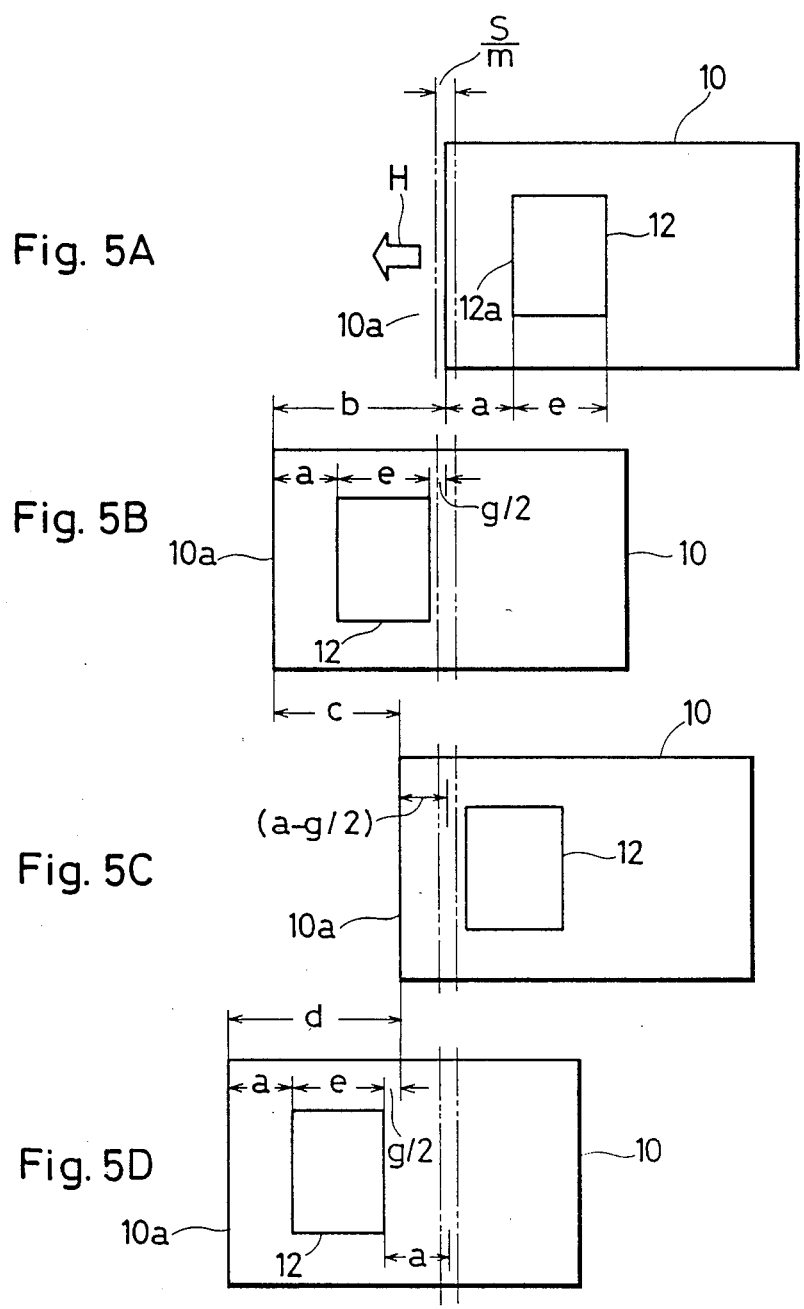

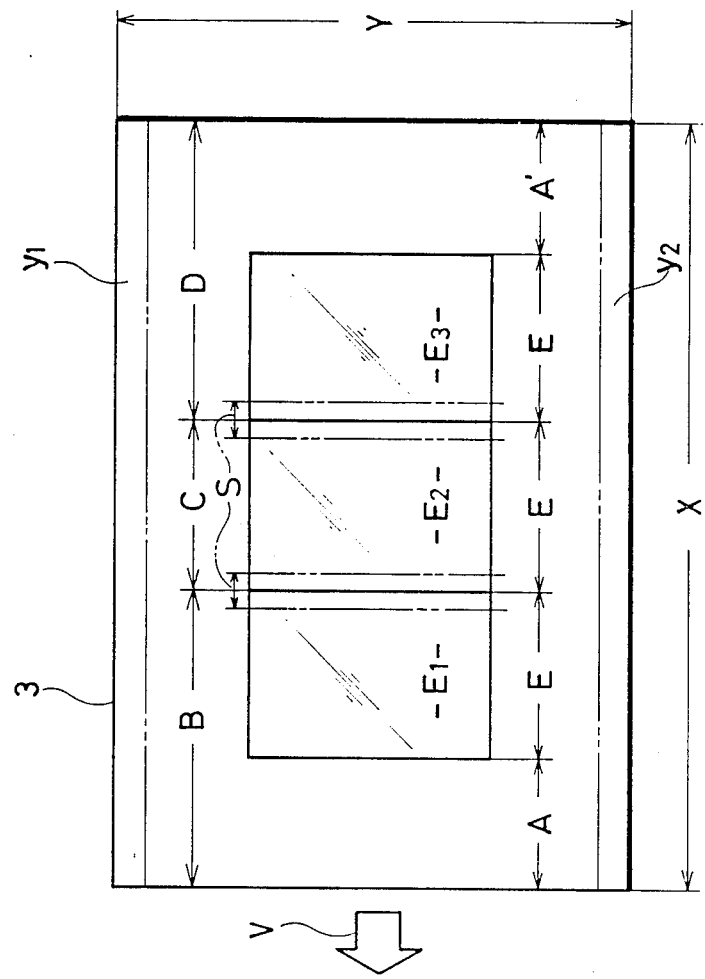

MULTIPLE-EXPOSURE APPARATUS IN A GRAPHIC ARTS COPYING MACHINE OF A SLIT-EXPOSURE TYPE

FIELD OF THE INVENTION AND RELATED ART STATEMENT

The present invention relates to a graphic arts copying machine of a slit-scanning exposure type for use in making intermediate original films, press plates, etc. for an offset printing apparatus and the like. More particularly, it relates to a so-called multiple-exposure apparatus, incorporated in that machine, for making plural exposed images of the same original onto a photosensitive material such as a master paper for a master plate.

Generally, when the subject is to be printed the multiple-exposures of an original are made on a single master plate material etc., in which two or more exposures of the same original are made on a photosensitive material for a master plate, such as a master paper and the like. Conventionally, graphic arts copying machines of a type suitable therefor have been employed to effect such multiple-exposures conveniently or advantageously.

In this connection, U.S. patent application Ser. No. 059,260 filed June 5, 1987 and now abandoned in favor of U.S. patent application Ser. No. 313,346 filed February 21, 1989 as a File Wrapper Continuation discloses such a multiple-exposure system.

Heretofore, however, no attempt has been made to concretely propose a multiple-exposure apparatus in a graphic arts copying machine of a slit-exposure type in which the multiple-exposures of the original can automatically be made on the photosensitive material once the required data are supplied to the data setting means.

SUMMARY OF THE INVENTION

With a view to solving the aforementioned problem, it is an object of the invention to provide a novel and improved multiple-exposure apparatus in a graphic arts copying machine of a slit-exposure type, in which the multiple-exposures of the original can automatically be made on the photosensitive material once the required data are supplied to the data setting means.

To accomplish the above object, there is provided, according to the invention, a multiple-exposure apparatus in a graphic arts copying machine of a slit-exposure type comprising: original holding means capable of horizontally reciprocating; an optical exposure system for exposing an optical image of a slitwise segment of said original onto a photosensitive material; moving means for reciprocating said holding means and conveying said photosensitive material relative to said optical exposure system, said moving means being adapted to synchronize the advance of said original holding means and said conveying of said photosensitive material; data setting means for setting predetermined data for a predetermined multiple-exposure layout mode of said original on said photosensitive material; means for controlling both the enabling and disabling of said exposing by said optical system, and said synchronizing by said moving means in an associated relation on the basis of said predetermined set data; whereby said multiple-exposures of said original are made on said photosensitive material in said predetermined multiple-exposure layout mode.

Thus, according to the invention, the multiple-exposures of the original can automatically be made on the photosensitive material once the required data are applied to the data setting means. Therefore, the operation of the copying camera is simplified.

Furthermore, the multiple-exposures in the desired exposure layout or assignment can be automatically attained.

Preferably, said predetermined multiple-exposure mode comprises one in which multiple-exposures of said original are made on said photosensitive material symmetrically relative to the center of a length in a reference direction of said photosensitive material.

In a preferred embodiment, said predetermined data comprises at least said length of said photosensitive material in said reference direction, a length of said original in a prescribed direction, and any two of a number of distances related to said multiple-exposures of said original, i.e. a gap between said multiple-exposures in said reference direction, and a length of a non-image formation area of said photosensitive material in said reference direction at one side edge thereof.

Hence, since the multiple-exposures of said original are made on said photosensitive material symmetrically relative to the center of a length in a reference direction of said photosensitive material according to the preferred embodiment of the invention, uniform printing pressure can be attained by simply mounting the photosensitive material around the plate cylinder of, for example, the offset press machine.

In one preferred embodiment, said predetermined multiple-exposure mode comprises one in which multiple-exposures of said original are made on said photosensitive material asymmetrically relative to the center of a length of said photosensitive material in a reference direction thereof.

In another preferred embodiment, said predetermined data comprises at least said length of said photosensitive material in said reference direction, a length of said original in a prescribed direction, and any three of a number of said multiple-exposures of said original, a gap between said multiple-exposures in said reference direction, and lengths of non-image formation areas of said photosensitive material in said reference direction at both side edges thereof.

In still another preferred embodiment, said exposure optical system is of a full scale type.

In a further preferred embodiment, said moving means comprises a single drive motor adapted to rotate, stop, and reversely rotate; rollers for conveying said photosensitive material; a drive transmission member associated with said drive motor and said rollers; and means, connected with said rollers, for enabling a drive transmission of said drive motor via said drive transmission member to said rollers when said original holding means advances and for disabling the same when said original holding means returns.

Preferably, said optical exposure system is of a variable magnification scale type.

In a further preferred embodiment, said moving means comprises a single drive motor adapted to rotate, stop, and reversely rotate; rollers for conveying said photosensitive material; a drive transmission member associated with said drive motor and said rollers; means, connected with said rollers, for enabling a drive transmission of said drive motor via said drive transmission member to said rollers when said original holding means advances and for disabling the same when said original holding means returns; and change gears, adapted to be switched in accordance with a drive ratio corresponding to a magnification scale; whereby said photosensitive material is conveyed a distance corresponding in scale change relation to an advancing distance of said original holding means.

Preferably, said drive transmission member is an endless belt.

In another embodiment, said means for enabling and disabling said drive transmission comprises a one-way clutch member.

In a further embodiment, said moving means comprises rollers for conveying said photosensitive material; and respective drive motors for reciprocating said original holding means and rotating said rollers, wherein one of said drive motors is adapted to be driven at different speeds in accordance with a magnification ratio.

Preferably, said controlling means comprises means for calculating data for use in said reciprocating of said original holding means and said conveying of said photosensitive material on the basis of said set data.

Still preferably, said data for use in reciprocating said original holding means and said conveying of said photosensitive material comprises data for initially mounting said original on said original holder.

Preferably, said data for initially mounting said original on said original holder is a distance from an exposure start line of said original holder to an exposure start line of said original.

In a preferred embodiment, the apparatus according to the invention further comprises display means for displaying said data for initially mounting said original on said original holder.

Hence, according to the preferred embodiment of the invention, the operator is able to readily mount the original on the original holding means by simply viewing the displayed data.

Preferably, said controlling means comprises means for lighting and extinguishing a lamp of said optical exposure system, said lighting and extinguishing means being adapted to light said lamp only for respective time periods required for said original holder means to traverse advancing distances.

In another embodiment, the apparatus according to the invention further comprises cutter means for cutting said photosensitive material by said length in said reference direction on the basis of said set data.

Preferably, said photosensitive material is a master paper for a master plate for use in offset printing.

BRIEF DESCRIPTION OF THE DRAWINGS

For the purpose of illustrating the invention, the drawing shows several forms of the invention which are presently preferred, it being understood, however, that the invention is not limited to the precise arrangements and instrumentalities shown.

FIG. 5A through 5D are explanatory views depicting a mode in which the original holder is driven to reciprocate for enabling a multiple-exposure of the original;

FIG. 8 is an explanatory view showing a variant of the layout or assignment of the multiple-exposure;

DETAILED DESCRIPTION OF THE PREFERRED EMBODIMENTS

Figure 1:
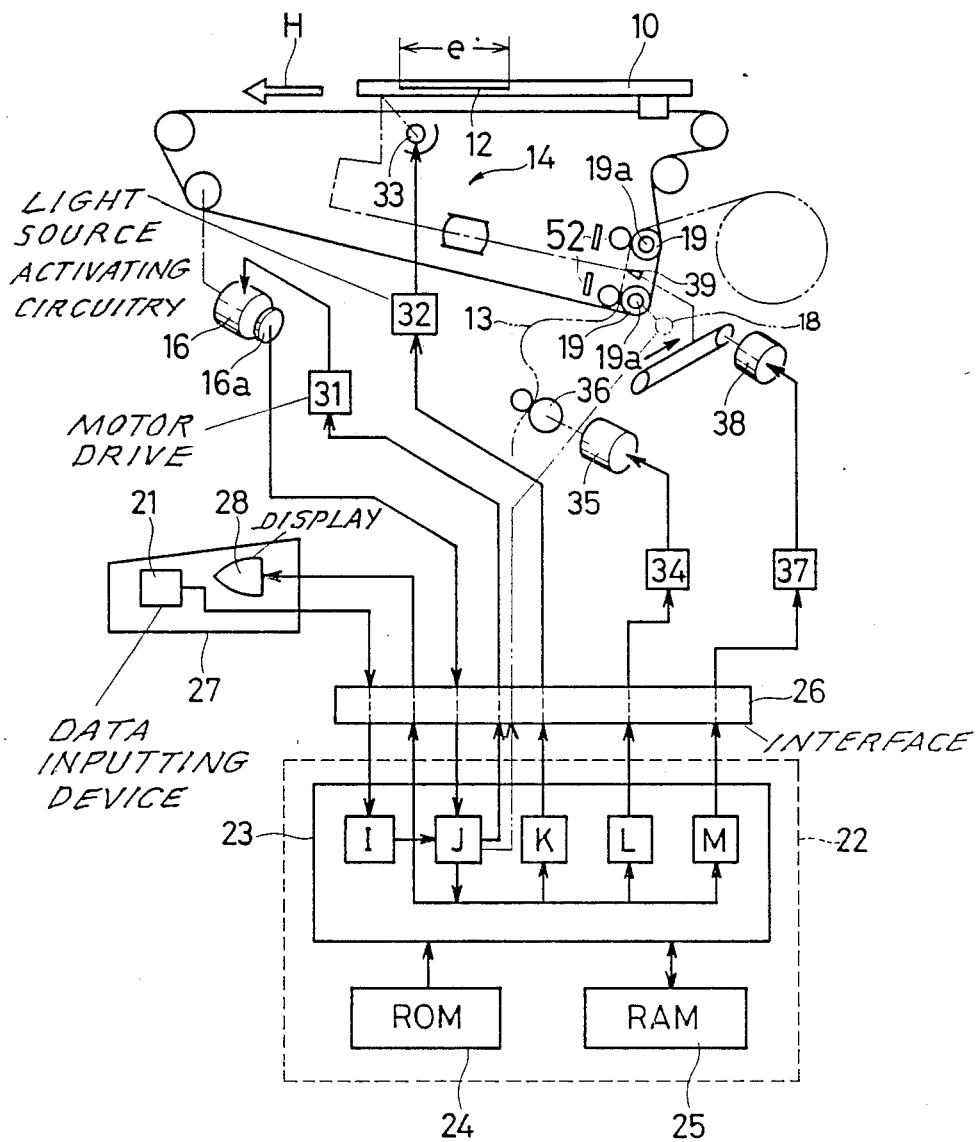
FIG. 1 is a schematic view illustrating an embodiment of a multiple-exposure apparatus according to the invention.

Referring to the drawings, there are described preferred embodiments of the invention below.

First Embodiment

In a graphic arts slit-exposure copying camera to which is applied the apparatus of the present embodiment, an original holder 10 is provided, capable of horizontal reciprocating motion and firmly holding an original 12. Beneath the holder 10 is disposed a variable magnification scale exposure optics 14 for focusing an optical image of a slitwise segment of an original 12 onto a photosensitive material 13. Such variable magnification scale exposure optics is constituted in a manner conventionally known to the graphic art, copying machine art such as that disclosed in U.S. patent application Ser. No. 241,627 filed September 8, 1988. The optics system (FIGS. 1 and 2) 14 includes an original illuminating lamp 33, plural lens 50 for determining a light path, image forming lens 51, and a set of slit plates 52 for enabling adjustment of the width of slit S, etc.. The image forming lens 51 and the light path lens 50 are independently moved by separate driving members (not shown) in accordance with an input magnification scale. A drive 15, which includes a single motor 16 and change gears 18, permits the holder 10 and photosensitive material 13 to move in synchronism with each other. A developing processing device 20 is provided to develop and stabilize the photosensitive material 13 which has already undergone exposure treatment. Thus, slitwise image segments of the original 12 are successively exposed onto the photosensitive material 13 through the optics 14 while the original holder 10 and the photosensitive material 13 are moved in synchronism with each other. The exposed photosensitive material 13 is then treated with developing processing by the developing processing device 20.

The size of the photosensitive material 13 depends on the size of a plate cylinder 100 (FIG. 3) of an offset press machine being employed where the photosensitive material 13 being treated is a printing plate material such as a master paper for a master plate. The size of the master paper 13 naturally follows the specified axial and circumferential lengths of the plate cylinder 100. It is desirable that multiple-exposures of the original 12 be made onto the master paper within an area of such size regularly.

Furthermore, when the photosensitive material 13 is mounted around the plate cylinder 100 of the offset press machine, it is desirable that the plural exposed images so made on the photosensitive material 13 be positioned as close to the axial center of the cylinder 100 as possible. Namely, exposure layout or assignment of the images on the photosensitive material 13 is preferred to be centered on the axial center of the cylinder 100. The purpose of this is to preclude the adverse effects in printing quality which is result from the fact that the pressure with which the surface of the plate cylinder surface against a 100 presses of an object to be printed is different at axial surface points of the cylinder, particularly between the central and end surface points thereof. Hence such layout is usually conducted with reference to the axial center of the cylinder 100 in order to obtain optimum uniformity in the printing pressure.

Figure 3:
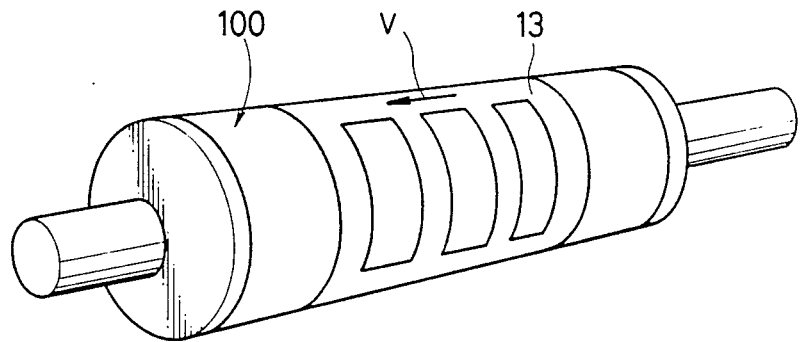
FIG. 3 is a schematic view showing a mode in which a sheet of exposed photosensitive material is mounted around a plate cylinder of an offset press machine such that a reference direction of the material agrees with the axial direction of the cylinder.

The present embodiment contemplates mounting the photosensitive material 13 around the plate cylinder 100 such that the reference direction V of the photosensitive material 13, i.e., the direction in which plural images are to be exposed thereon in order, agrees with the axial direction of the plate cylinder 100, per FIG. 3. The plural images are accordingly exposed on the photosensitive material 13 symmetrically with respect to the center of the material 13 in the reference direction V.

Referring again to FIG. 1, the multiple-exposure apparatus according to the invention is incorporated in the aforementioned copying camera, and includes a multiple-exposure data inputting device 21 and a multiple-exposure operation control device 22.

The data inputting device 21 is provided on an operation panel 27 of the body of the copying camera. An operator inputs information by means of a ten-key keyboard or the like such information typically includes the length X (FIG. 4) in a feeding direction (i.e., the reference direction V) of the photosensitive material 13, width e (FIG. 5) in a reciprocating direction of the original 12, the number n of exposures of the original 12 to be made on the photosensitive material 13, the gap G (FIG. 4) defined between the exposed images E1, E2, E3 of the original 12 on the material 13 in that feeding direction, magnification ratio m, etc.

The multiple-exposure operation control device 22 controls the reciprocating motion of the original holder 10, the conveying of the photosensitive material 13, and the synchronized exposure of the same by the focusing optics 14, all in an interrelated manner. The device 22 is constituted by a microcomputor including a central processing unit (CPU) 23, a read only memory (ROM) 24, and a random access memory (RAM)25. Input and output interface is shown at 26. The device 22 produces a variety of functions I, J, K, L, and M. For the convenience of explanation, these functions are symbolically illustrated as members incorporated in the microcomputor 22.

The function I is a driving data calculation member which is required to find values A, A' (FIG. 4) for defining a layout of exposed images E1 through E3 on the photosensitive material 13 a (FIG. 5) value a for positioning the original 12 on the holder 10, and data b, c, and d for use in reciprocating the holder 10 etc., as will be described below.

Figure 4:
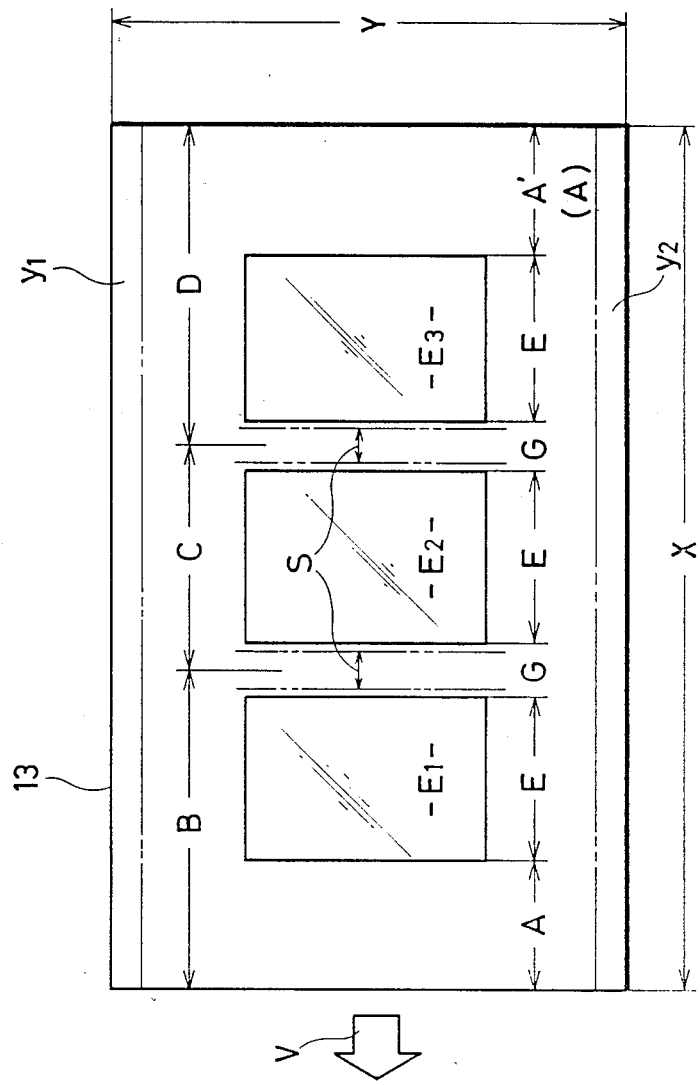
FIG. 4 is an explanatory view illustrating an example of a layout or assignment of multiple-exposures according to a first embodiment of the invention.

In this embodiment, the photosensitive material 13 is fed in a direction indicated at V in FIG. 4. The width Y of the material 13 corresponds to a prescribed circumferential length of the plate cylinder 100 of the offset press machine, although the value Y is larger than the circumference of the plate cylinder by those lengths y1 and y2 which are required in order to mount the material 13 around the cylinder by connecting them with each other. Meanwhile, the length X in the feeding direction V of the photosensitive material 13 corresponds to a prescribed axial length of the plate cylinder 100. Thus, lengths X and Y of the photosensitive material 13 are naturally determined by the axial and circumferential lengths of the plate cylinder 100, respectively, which are prescribed by the specification of the press machine being employed.

The values A and A' denote widths of non-image areas at the leading and trailing edges of the photosensitive material 13, respectively, wherein the values A and A' are equal since the images E1 through E3 are made symmetrically with respect to the center of the length X in the present embodiment. Each width in the feeding direction of image-formation areas E1 through E3 on the material 13 is indicated at E. The width E is m times the width e of the original 12, since the copying camera is of the variable magnification scale type. In case the letters or pictures of the original 12 are to occupy its whole area (i.e., no blank is laid thereon and accordingly exposed letters or pictures occupy all of the image-formation areas E1 through E3) the width G is chosen to be equal to or larger than the slit-exposure width S of the copying camera. This is done because if the gap G is smaller than the slit width S, adjacent or adjoining portions of the image-formation areas will be exposed to light diffracting from the exposure slit and part of the expected images will be cancelled (or-- and change "affected the same if the gap G is" to-- affected). This problem is even greater if no gap is provided. Accordingly, the width A, A' is found based on the following equation:

$$A = [X - nE - (n-1)G]/2 \tag{1}$$

where n is a number of multiple-exposures of the original, and G=S.

The original holder 10 advances in a direction denoted by H in FIG. 5A. The original 12 is mounted on the holder 10 such that its exposure start edge line 12a is spaced from the exposure start line 10a of the holder 10 by the distance a.

The distance a is calculated by dividing the thus found value A by the magnification ratio m, and is displayed by a display 28 (FIG. 1) on the operation panel 27. The distance a corresponds to the distance A, since the present invention is applied to a copying camera of the variable magnification type in this embodiment and at the same time the original holder 10 and photosensitive material 13 are permitted to advance in synchronism with each other by means of an endless transmission belt 17 which is rotated by the single driving motor 16. The operator, viewing the displayed value a, mounts the original 12 onto the holder 10 in the above distance relation.

The function I finds data b to d for driving the original holder 10 to reciprocate as shown in FIG. 5A through 5D, according to the following equations:

$$b = a + e + (g/2) \quad (2)$$

$$c = b - (a - g/2) = e + g \quad (3)$$

$$d = b \quad (4)$$

where e is the length of the original 12 in a moving direction H of the holder 10, and corresponds to the width E of the image-formation area E1 through E3 of FIG. 4, whereas g is a value corresponding to the gap G defined between the images E1 to E3 so that gm=G.

By the use of equation (2), an advancing distance b of the original holder 10 is determined in the direction H for executing a first exposure of the original 12, per FIG. 5B.

Likewise, according to equation (3), it is posible to calculate distance c which the holder 10 traverses to move backward and forward for another exposure, per FIG. 5C.

According to equation (4), a distance d is found through which the holder 10 advances to effect a final exposure of the original 12, per FIG. 5D.

The data obtained by the function I according to the equations (1) through (4) are stored in the internal memory RAM 25.

The function J is a synchronous driving control member. The function J controls the drive of the motor 16 on the basis of the data obtained above by actuating the motor drive circuitry 31. The member J controls the rotating, reverse rotating, and stopping of the motor 16 while monitoring the amount of movement of the holder 10 on the basis of pulse signals supplied by a pulse generator 16a which is mechanically coupled to the motor 16.

Conveyer rollers 19 for conveying the photosensitive material 13 past an exposure station F to feeding rollers 36 are rotated by the endless belt 17 and the change gears 18 via a one-way clutch 19a. The clutch 19a is designed to connect the drive of the conveyor belt 17 and the rollers 19 when the motor 16 is rotated, and to disconnect the same when the motor 16 is reversely rotated. Thus, the photosensitive material 13 is conveyed in synchronization with the advance of the original holder 10 and is kept stationary when the original holder 10 is moved backward. The roll of photosensitive material 13 is intermittently pulled out and conveyed through the distances B, C, and D, per FIG. 4. These distances B, C, and D are determined to be equal to ones m times the advancing distances b, c, and d of the original holder 10, respectively, which is made possible by the change gears 18 that are switched in accordance with the reduction ratio corresponding to the input magnification scale m by the commands supplied by the member J. Naturally, no change gear 18 is necessary where the copying camera is of a full scale dedicated type.

The function K is an exposure operation commencement and termination control member. The member K adjusts the optical system 14 in accordance with the input magnification scale and controls the lighting and extinguishing of an illumination lamp 33 by giving commands to a light source actuating circuitry 32 upon receipt of the control signals transmitted by the member J. The member K allows the lamp 33 to be lighted for respective time periods required for the original holder 10 to traverse the proceeding distances b, c, and d, so that the same images E1 to E3 of the original 12 are multiple-exposed on the photosensitive material 13 through the focusing optics 14.

The function L is a roller feed control member. The function L controls the drive of a motor 35 by applying commands to roller feed actuating circuitry 34 upon receiving the control signals delivered by the member J. Thus, under the control of the member L, the feed rollers 36 sandwich the leading edge of the photosensitive material 13 undergoing a first exposure and being carried by the conveyor rollers 19. Then, the rollers 36 stand by, doing so, until an n−1th exposure is completed. No sooner does the final exposure begin than the rollers 36 begin to feed the photosensitive material 13 into the developing device 20.

The function M is a cutter control member which control the drive of a motor 38 for a cutter 39 by giving commands to the cutter actuating circuitry 37 upon receipt of the control signals applied by the control member J. Under the control of the member M, the cutter 39 is actuated by the drive motor 38 to traverse and cut the stationary photosensitive material 13, undergoing the final exposure, by the input length X.

Figure 6A:
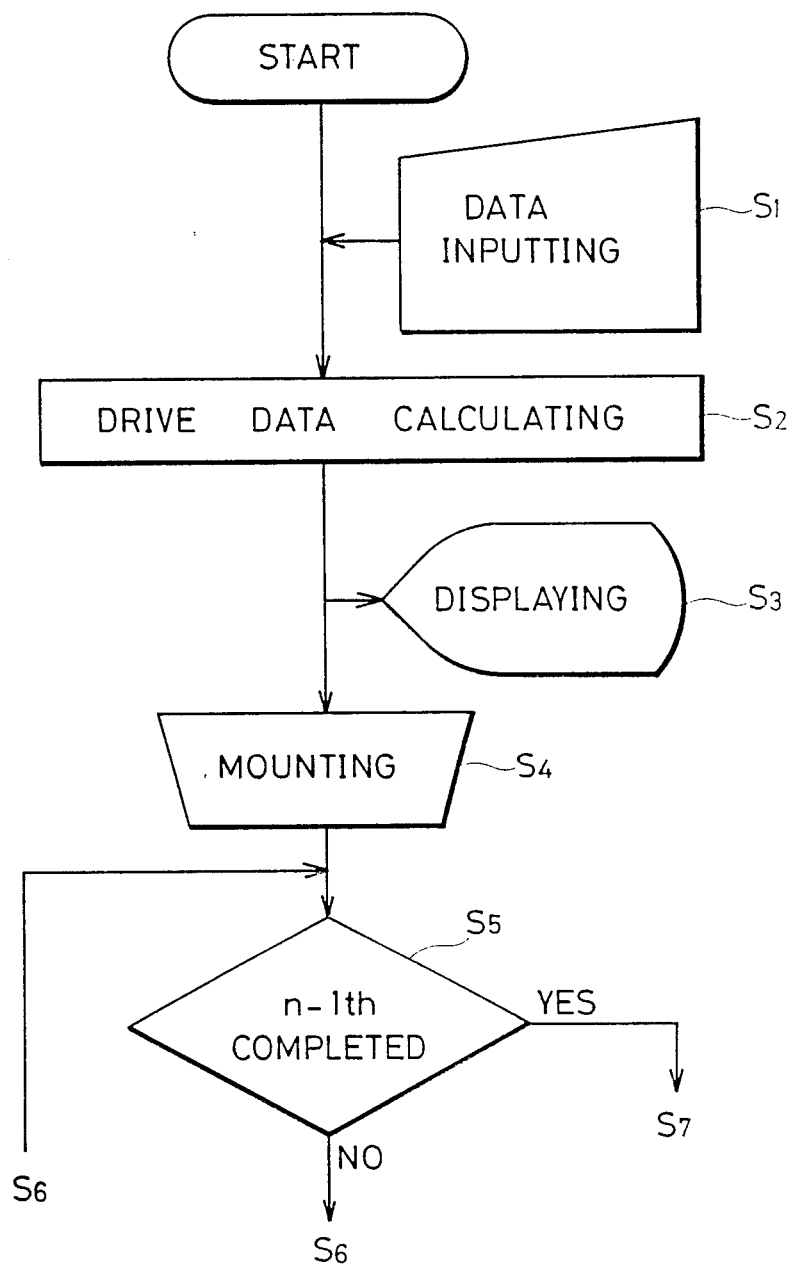
FIGS. 6A and 6B are flowcharts showing the procedure for a multiple-exposure operation.
Figure 6B:
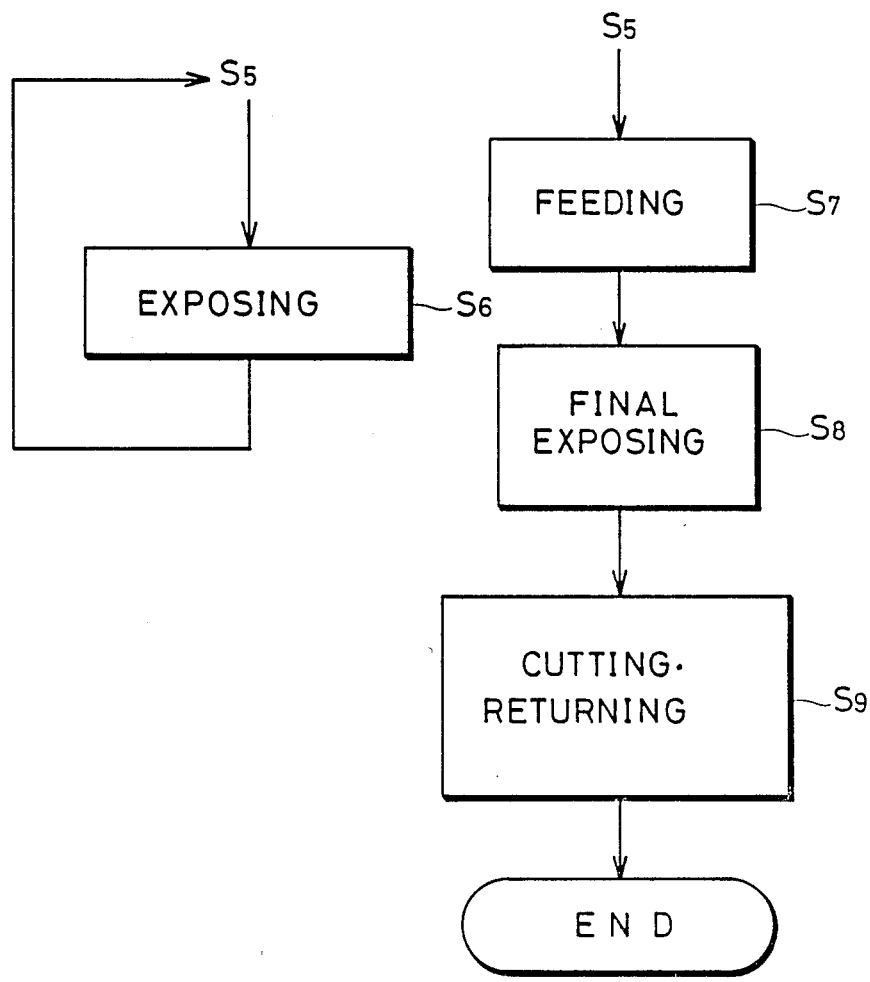

Next will be a description as to the procedures for the multiple-exposure operation per FIG. 6A and 6B.

At step S1, the multiple-exposure data setting device 21 receives as an input the length X of the photosensitive material 13, the length e of the original 12, the number n of exposures of the same, the gap G to be defined between the respective exposed images, and the magnification ratio m.

Where that preset value of the gap G, which is arranged to be automatically supplied to the device 21, is equal to or larger than the slit width S of the copying camera, the operator's input of the gap data G can be effectively omitted. At the same time it is ensured that the exposed images will be concentrated on the center in the reference direction V of the photosensitive material 13 to the utmost.

Where the required number n of the exposures is fixed, as in the case of a double-exposure dedicated copying camera, the number being 2, that fixed number n should be automatically inputted to the device 21.

At step S2, the data A, a, and b, c, and d are all calculated by the drive data calculating member I as a function of the above inputted data.

At step S3, the original position data a is displayed by the display 28. At step S4, the operator mounts the original 12 on the original holder 10 according to the displayed data a and then pushes a start key on the operation panel 27.

At step S5, the member J determines whether the n−1th exposure on the photosensitive material 13 is completed. If that exposure is not terminated, the multiple-exposures of the original 12 onto the photosensitive material 13 are successively performed at step S6, whereas the operation proceeds to step S7 when the n−1th exposure is completed.

Figure 7D:
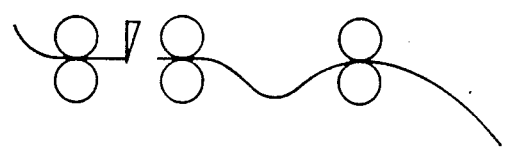
FIGS. 7A through 7D are explanatory views illustrating a mode in which the photosensitive material is conveyed.

In detail, at step S6 the illumination lamp 33 is lighted in synchronization with the commencement of the advancement in the direction H of the original holder 10. At the same time, the rolled photosensitive material 13 is pulled out by the rollers 19. However, it is not until the leading edge of the photosensitive material 13 is conveyed the length A that the first image E1 starts being exposed and recorded thereon, as will be readily appreciated from FIG. 7B. The original holder 10, after advancing the distance b, is stopped, per FIG. 5B, and in synchronism with this the photosensitive material 13 is stopped after being conveyed the length B. Next, the holder 10 is restored the distance c, and stopped to stand by a second exposure, per FIG. 5C.

To effect the second exposure, the original holder 10 again advances the distance c, and at the same time the photosensitive material 13 is conveyed the distance C and then stopped. Subsequently, the original holder 10 is again returned the distance c to stand by a third exposure.

Figure 7C:
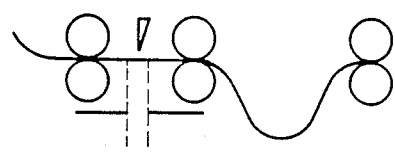
Figure 7B:
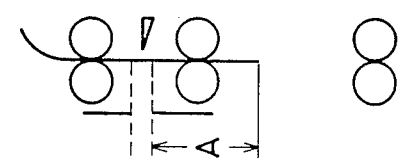
Figure 7A:
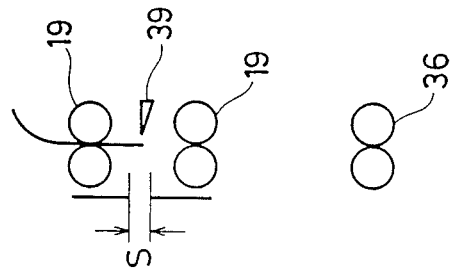

During step S6, the rollers 36 are not actuated to feed the photosensitive material 13, sandwiching the leading edge thereof, as illustrated in FIG. 7C.

At step S7, the rollers 36 are actuated to feed the photosensitive material 13 into the developing device 20, and at the same time a third (final) exposure is conducted. To attain the final exposure, the original holder 10 proceeds through the distance d, per FIG. 5D, and the photosensitive material 13 is synchronously conveyed the length D and stopped. The length D is determined to be equal to the length B for the first exposure.

At step S9, the exposed photosensitive material 13 is cut by the cutter 39 by the preset length X, per FIG. 7D. The original holder 10 is restored to the initial start position shown in FIG. 5A, and stopped. In consequence, the plural exposed images E1 through E3 are made on one sheet of photosensitive material 13 of the above preset size such that the exposed assignment or layout thereof is symmetrical with respect to the center of the length X of the photosensitive material 13.

In this embodiment, the multiple-exposure data which are preset are the length X of the photosensitive material 13, the length e of the original 12, the number n of the exposures, the gap G, and the magnification ratio m. The value A (A') for defining the non-image formation length in the direction X, however, may be used as input data to either the number n or the gap G as the input data. This is because once any two pieces of data out of the three data pieces, i.e. the number n, gap G, and the length A, are preset, the other can be found according to equation (1). Where the present invention is applied to a full scale dedicated copying camera, the magnification scale m is not required as an to input.

In the foregoing embodiment, the width G is determined to be equal to or larger than the slit exposure width S for the reasons given above. However, insofar as a blank=S/2 m is laid on the original 10 and accordingly exposed letters or pictures should occupy each of the image-formation areas E1 through E3 with a blank m times the former, it is not necessary to provide, a gap G as depicted in FIG. 8. In order to effect the exposure mode of FIG. 8, the above drive data etc. are found based on the value G=0 in equations (1) through (4).

Second Embodiment

Figure 9:
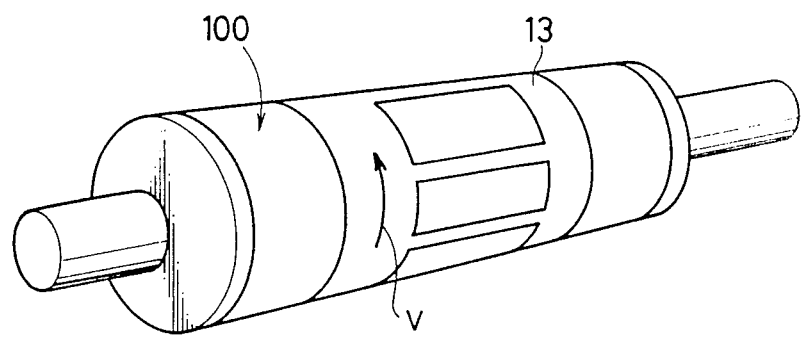
FIG. 9 is a schematic view illustrating another mode, in which a sheet of exposed photosensitive material is mounted around the plate cylinder such that the reference direction of the material coincides with the circumferential direction of the cylinder.

The next embodiment mounts the photosensitive material 13 around the plate cylinder 100 such that the reference direction V of the photosensitive material 13, i.e., the direction in which plural images are to be exposed thereon in order, coincides with the circumferential direction of the plate cylinder 100, per FIG. 9. Accordingly, it is unnecessary to expose the plural images on the photosensitive material 13 symmetrically with respect to the center of the material 13 in the reference direction V. To attain the uniform printing pressure desired, the operator simply aligns the center, in a direction normal to the direction V of the photosensitive material 13, with the axial center of the plate cylinder 100 in mounting the former around the latter.

Differences of the second embodiment from the first embodiment will be described below.

In this embodiment, the operator inputs to the data inputting device 21, by means of ten-key keyboard or the like, such data as the length X of the photosensitive material 13, the length e of the original 10, the number n of the exposures, the width A of the non-image area at the leading edge side of the photosensitive material 13, the gap G, and the magnification scale m.

Figure 10:
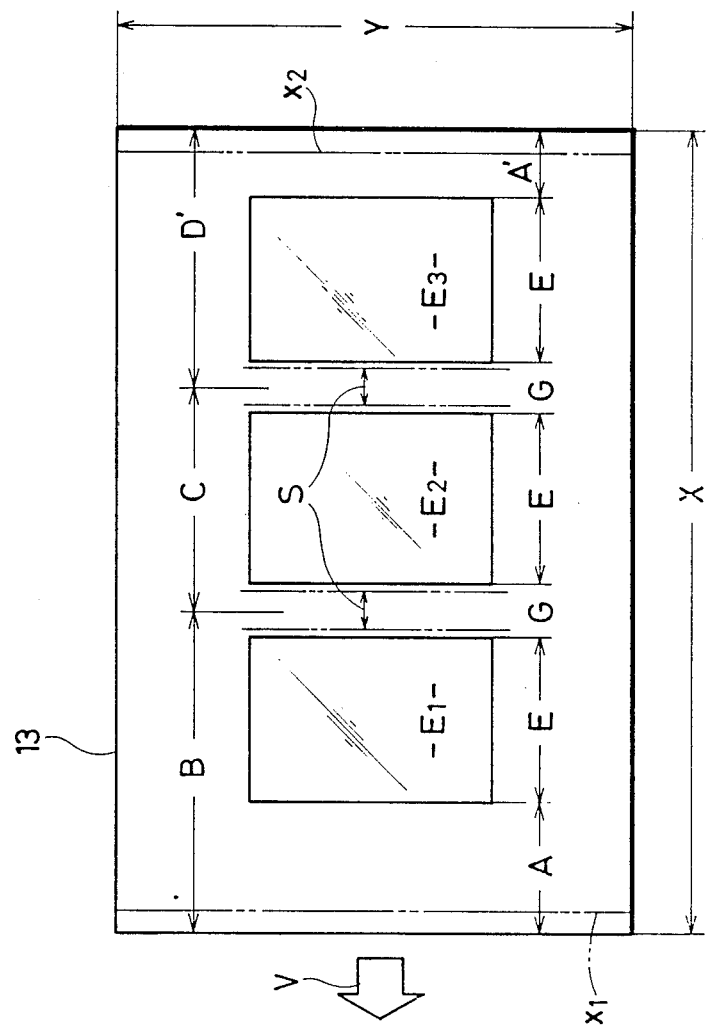
FIG. 10 is a schematic top plan view depicting an example of the multiple-exposure layout conducted by the multiple-exposure apparatus according to another embodiment of the invention.
Figure 11A:
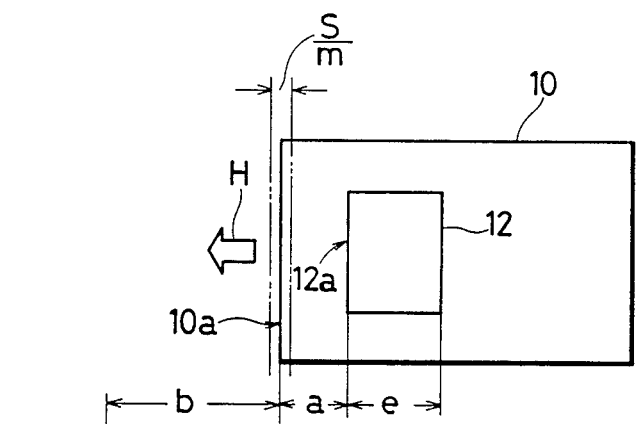
FIGS. 11A through 11D are views explaining another mode in which the original holder is driven to reciprocate for enabling the multiple-exposure layout of FIG. 10.
Figure 11B:
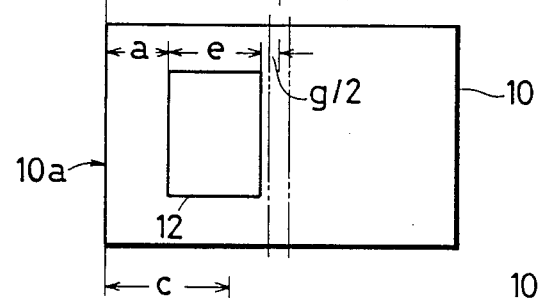
Figure 11C:
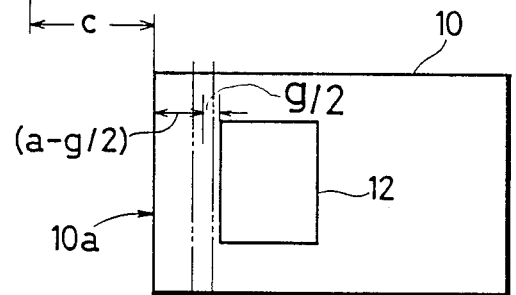
Figure 11D:
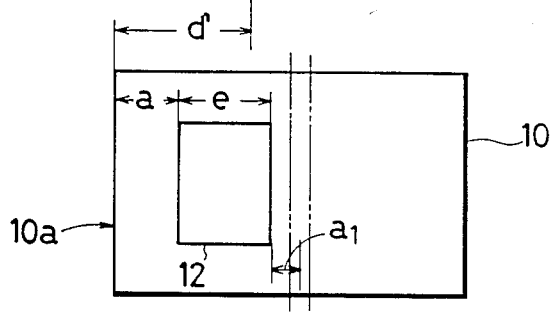

Based on the input data, the function I of the multiple-exposure control device 22 performs calculations to find the value A' of the non-image area of the trailing edge side for defining a layout of the exposed images E1 through E3 on the photosensitive material 13, as shown in FIG. 10, and the data b, c, and d' for use in reciprocating the original holder 10, as illustrated in FIGS. 11A through 11D, according to the above equations (2) and (3) and also to the following equations:

$$A' = X - nE - (n - 1)G - A \quad (5)$$

$$d' = a1 + e + (g/2) \quad (6)$$

where $A = A'$, and $a1$ is a value obtained by dividing the width A' by the magnification scale m ($a1m = A'$). Per FIG. 10, widths x1 and x2 are provided on the non-image areas A and A', respectively, which are required to mount the photosensitive material 13 around the plate cylinder 100 by connecting together the leading and trailing edges of the material 13. In this case, since the widths x1 and x2 are provided, the following equations are established:

$$A \geq x1 \ (x1 > 0)$$

$$A' \geq x2 \ (x2 > 0)$$

Such width x2, however, is not always necessary depending upon the type of plate cylinder, so that $x2 = 0$, i.e., $A' = 0$ if unnecessary. Furthermore, condition $x2 \geq S$, i.e., $A' \geq S$ is required dependent on the exposed image-formation state of the photosensitive material 13, or the like. This embodiment will be described for the case where the width $x2 \geq 0$, by way of example. Needless to say, the required data also can be found according to the above equations for the condition $A' = 0$.

The following is made as to the procedures for the multiple-exposure operation according to the present embodiment per FIG. 6A and 6B, as in the first embodiment.

At step S1, the multiple-exposure data setting device 21 receives as its input the width A of the non-image area on the leading edge side of the photosensitive material 13, the length X of the photosensitive material 13, the length e of the original 12, the number n of exposures of the same, the gap G to be defined between the respective exposed images, and the magnification ratio m.

Where the values A and G as fixed are arranged to be automatically supplied to the device 21, the operator's inputting work for such data can be effectively omitted. Where the required number n of the exposures is fixed, as in the case of a double-exposure dedicated copying camera, the number being 2, that fixed number n will be automatically inputted to the device 21.

At step S2, the data a, A', a1, and b, c, and d' are all calculated by the drive data calculating member I on the basis of the above inputted data.

At step S3, the data a for the original is displayed by the display 28. At step S4, the operator mounts the original 12 on the original holder 10 according to the displayed data a and then pushes a start key on the operation panel 27.

At step S5, the member J determines whether the n−1th exposure has been made on the photosensitive material 13. If that exposure is not terminated, the multiple-exposures of the original 12 onto the photosensitive material 13 are successively performed at step S6, whereas the operation proceeds to step S7 when the n−1th exposure is completed.

In detail, at step S6 the illumination lamp 33 is lighted in synchronism with the commencement of the advance in the direction H of the original holder 10. At the same time, the rolled photosensitive material 13 is pulled out by the rollers 19. However, it is not until the leading edge of the photosensitive material 13 is conveyed the length A that the first image E1 starts being exposed and recorded thereon, as readily appreciated from FIG. 7B. The original holder 10, after advancing the distance b, is stopped, per FIG. 11B, and in synchronization with this the photosensitive material 13 is stopped after being conveyed the length B. Next, the holder 10 is restored the distance c, and stopped to stand by for a second exposure, per FIG. 11C.

To effect the second exposure, the original holder 10 again advances the distance c, and at the same time the photosensitive material 13 is conveyed the distance C and then stopped. Subsequently, the original holder 10 is again returned the distance c to stand by for a third exposure.

During step S6, the rollers 36 are not actuated to feed the photosensitive material 13, but sandwich the leading edge thereof, as illustrated in FIG. 7C.

At step S7, the rollers 36 are actuated to feed the photosensitive material 13 into the developing device 20, and at the same time a third (final) exposure is conducted. To attain the final exposure, the original holder 10 is advanced for a distance d', per FIG. 11D, and the photosensitive material 13 is synchronously conveyed the length D' and stopped. The length D' is determined to be unequal to the length B for the first exposure, unlike the first embodiment.

At step S9, the exposed photosensitive material 13 is cut by the cutter 39 by the preset length X, per FIG. 7D. The original holder 10 is restored to the initial start position shown in FIG. 11A, and stopped. In consequence, the plural exposed images E1 through E3 are made on one sheet of photosensitive material 13 of the above preset size, as illustrated in FIG. 10.

In this embodiment, the multiple-exposure data which are preset the length X of the photosensitive material 13, the length e of the origianl 12, the number n of the exposures, the width A of the photosensitive material 13, the gap G, and the magnification ratio m. The value A' for defining one edge area of the non-image formation length in the direction V, however, may may replace either the value A, the number n or the gap G as input data. This is so because, so once any three data are known out of the four data, i.e., the number n, gap G, and the lengths A, A', the rest can be found according to equation (5). If the present invention is applied to a full scale dedicated copying camera, the magnification scale m is not a required input.

Third Embodiment

The third embodiment contemplates using the invention with a graphic arts copying camera of the full scale, i.e. equal magnification ratio, dedicated type.

Differences between this embodiment and the first embodiment will be described below.

The values b, c, and d for determining the amounts of movement the original holder 10 are set equal to the values B, C, and D, respectively, of the conveying distances for the photosensitive material 13. Thus, both the holder 10 and the photosensitive material 13 are moved the same amount by the single driving motor 16.

Figure 2:
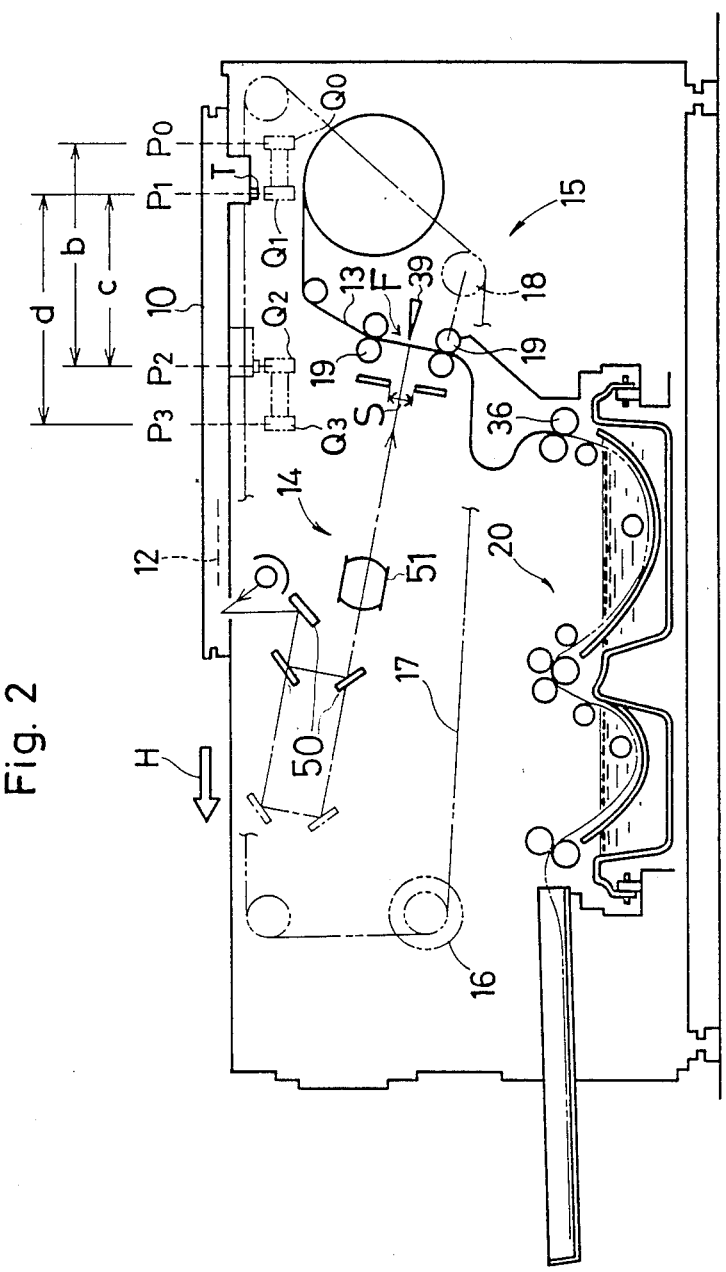
FIG. 2 is a schematic view depicting a slit-scanning exposure type copying camera which incorporates each of the apparatuses according to embodiments of the invention.

To this end, it is possible to replace the pulse generator 16a with first through fourth sensors Q0-Q3 for detecting the positions of the original holder 10 in order to determine the amounts of movement b, c, and d of the holder 10, per FIG. 2.

The first sensor Q0 detects the original position P0 of an object T of the holder 10. The second sensor Q1 detects a first position P1 thereof to which the object T of the holder 10 is returned after the first and second exposures and from which the object T advances for the second and third exposures. The third sensor Q2 detects a second position P2 to which the object T proceeds for the first and second exposures, and the fourth sensor Q3 detects a third position P3 which the object T reaches for the final exposure.

The value b of the holder 10 for the first exposure is defined as a distance which the object T of the holder 10 traverses in moving from the original point P0 to the second position P2, the value c for the second exposure is the distance from the position P1 to position P2, the value d for the final exposure is the distance from the position P1 to the position P3.

It is possible to slide the sensors Q2 and Q3 in order to change their positions depending on the size e of the original 12.

Thus, in this embodiment, the multiple-exposure operation control device 22 can be simpler and less complex as compared with that of the first embodiment, and therefore the instant invention can be put into practice more conveniently or advantageously.

Furthermore, since a full scale dedicated copying camera is employed, a change gear is not necessary. Thus, the simplification of the arrangement can be further promoted in this embodiment.

In the above embodiments, the single motor 16 and change gears 18 are provided for effecting variable magnification recording of the original onto the photosensitive material. To the same end, however, it is possible to omit the gears and the endless belt, and to instead provide discrete driving motors for reciprocating the original holder 10 and for rotating the conveying rollers for the photosensitive material 13. In that case, one of the motors, preferably the one for the original holder, is designed to be driven at different speeds in accordance with the input magnification ratio.

While several preferred embodiments of the present invention have been described above, it should be understood that various modifications may be made therein without departing from the spirit of the invention and the scope of the appended claims.

What is claimed is:

1. A multiple exposure apparatus in a graphic arts copying machine, said apparatus comprising:
    original holding means mounted for horizontal reciprocating motion;

an optical exposure system for exposing an optical image of a slitwise segment of said original onto a photosensitive material;

moving means for reciprocating said holding means and conveying said photosensitive material relative to said optical exposure system, said moving means being operative to advance said original holding means and to convey said photosensitive material in synchronism;

data setting means for setting predetermined data for a predetermined multiple-exposure layout mode of said original onto said photosensitive material;

means for controlling the operation of said optical system and said moving means in an associated relationship as a function of said predetermined data set by the data sensing means;

whereby multiple-exposures of said original are made on said photosensitive material in said predetermined multiple-exposure layout mode.

2. An apparatus as recited in claim 1, wherein said predetermined multiple-exposure mode is one in which multiple-exposures of said original are made onto said photosensitive material symmetrically relative to a center of a length of said photosensitive material along a reference direction of said photosensitive material.

3. An apparatus as recited in claim 2, wherein said predetermined data comprises at least said length of said photosensitive material in said reference direction, a length of said original in a prescribed direction, and any two of the following three parameters, (1) a number (n) of said multiple-exposures of said original, (2) a gap on said photo-sensitive material between said multiple-exposures in said reference direction, and (3) a length of a non-image formation area of said photosensitive material in said reference direction at one side edge thereof.

4. An apparatus as recited in claim 1, wherein said predetermined multiple-exposure mode comprises multiple-exposures of said original onto said photosensitive material asymmetrically relative to a center of a length of said photosensitive material along a reference direction of said photosensitive material.

5. An apparatus as recited in claim 4, wherein said predetermined data comprises at least said length of said photosensitive material in said reference direction, a length of said original in a prescribed direction, and any three of the following parameters, (1) a number (n) of said multiple-exposures of said original, (2) a gap between said multiple-exposures in said reference direction, and (3), (4) lengths of non-image formation areas of said photosensitive material in said reference direction at both side edges thereof.

6. An apparatus as recited in claim 1, wherein said optical exposure system is of a full scale type.

7. An apparatus as recited in claim 6, wherein said moving means comprises a single drive motor arranged to rotate, forward stop, and reversely rotate; rollers for conveying said photosensitive material; a drive transmission member coupled to said drive motor and said rollers; and means, connected with said rollers, for enabling a drive transmission of said drive motor via said drive transmission member to said rollers when said original holding means advances and disabling the same when said original holding means returns.

8. An apparatus as recited in claim 7, wherein said drive transmission member is an endless belt.

9. An apparatus as recited in claim 1, wherein said optical exposure system is of a variable magnification ratio type.

10. An apparatus as recited in claim 9, wherein said moving means comprises a single drive motor adapted to rotate forward, stop, and reversely rotate; rollers for conveying said photosensitive material; a drive transmission member coupled to said drive motor and said rollers; and means, connected with said rollers, for enabling a drive transmission of said drive motor via said drive transmission member to said rollers when said original holding means advances and disabling the same when said original holding means returns; and change gears switchable in accordance with a drive ratio corresponding to a chosen magnification ratio; whereby for a given advance of said original holding means said photosensitive material is conveyed a distance with a corresponding scale change determined by a chosen magnification ratio.

11. An apparatus as recited in claim 10, wherein said drive transmission member is an endless belt.

12. An apparatus as recited in claim 10, wherein said means for enabling and disabling said drive transmission comprises a one-way clutch member.

13. An apparatus as recited in claim 9, wherein said moving means comprises rollers for conveying said photosensitive material; and respective drive motors for reciprocating said original holding means and rotating said rollers, one of said drive motors being driven at different speeds in accordance with the magnification ratio.

14. An apparatus as recited in claim 1, wherein said controlling means comprises means for calculating data as a function of said predetermined set data for controlling said moving means to reciprocate said original holding means and to convey said photosensitive material.

15. An apparatus as recited in claim 14, wherein the calculated data comprises data for initially mounting an original on said original holding means.

16. An apparatus as recited in claim 15, wherein said data for initially mounting said original on said original holding means comprises a distance from an exposure start line of said original holding means to an exposure start line of said original.

17. An apparatus as recited in claim 16, further comprising display means for displaying said distance data for initially mounting said original on said original holding means.

18. An apparatus as recited in claim 1, wherein said controlling means comprises means for energizing and extinguishing a lamp of said optical exposure system, said energizing and extinguishing means energising said lamp only for time periods required for said original holding means to traverse advancing distances.

19. An apparatus as recited in claim 1, further comprising cutter means for cutting said photosensitive material by said length in said reference direction as a function of said predetermined set data.

20. An apparatus as recited in claim 1, wherein said photosensitive material is a master paper for a master plate for use in offset printing.

* * * * *